(12) United States Patent
Seto

(10) Patent No.: US 12,044,283 B2
(45) Date of Patent: Jul. 23, 2024

(54) DAMPER DEVICE

(71) Applicant: NIFCO INC., Yokosuka (JP)

(72) Inventor: Yasuhiko Seto, Yokosuka (JP)

(73) Assignee: NIFCO INC., Yokosuka (JP)

( * ) Notice: Subject to any disclaimer, the term of this patent is extended or adjusted under 35 U.S.C. 154(b) by 175 days.

(21) Appl. No.: 17/665,934

(22) Filed: Feb. 7, 2022

(65) Prior Publication Data

US 2022/0260128 A1 Aug. 18, 2022

(30) Foreign Application Priority Data

Feb. 15, 2021 (JP) ................. 2021-021499

(51) Int. Cl.
*F16F 9/32* (2006.01)

(52) U.S. Cl.
CPC ................. *F16F 9/3235* (2013.01)

(58) Field of Classification Search
CPC ...... F16F 7/09; F16F 9/432; F16F 9/36; F16F 9/362; F16F 9/368; F16F 9/3235
See application file for complete search history.

(56) References Cited

U.S. PATENT DOCUMENTS

| | | | | |
|---|---|---|---|---|
| 7,147,216 B2* | 12/2006 | Gassner | ............... | F16F 9/3214 |
| | | | | 267/153 |
| 8,348,028 B2* | 1/2013 | Zimmer | ............... | F16F 9/0218 |
| | | | | 188/134 |
| 9,127,493 B2* | 9/2015 | Zimmer | .................. | F16F 9/368 |
| 9,850,975 B2* | 12/2017 | Tomita | .................... | F16F 7/095 |
| 10,883,557 B2* | 1/2021 | Tomita | ...................... | F16F 7/09 |
| 2002/0088677 A1* | 7/2002 | Fitz | ........................ | F16F 9/3465 |
| | | | | 188/304 |
| 2009/0205485 A1* | 8/2009 | Zimmer | ................ | F16F 9/3228 |
| | | | | 92/8 |

FOREIGN PATENT DOCUMENTS

JP H08-133029 A 5/1996

OTHER PUBLICATIONS

DE 20122569 U1 (Year: 2006).*

* cited by examiner

*Primary Examiner* — Robert A. Siconolfi
*Assistant Examiner* — Mahbubur Rashid
(74) *Attorney, Agent, or Firm* — HAUPTMAN HAM, LLP

(57) ABSTRACT

A damper device for providing a braking force includes a cylinder member having an inner wall, and a piston member slidably disposed in the cylinder member, the braking force being generated by movement or relative movement of the piston member. The piston member includes a seal member having an attachment base, and a lip portion extending from the attachment base and contacting the inner wall of the cylinder member, and a bending regulation portion assembled with the seal member for regulating an outer surface of the attachment base of the seal member.

3 Claims, 9 Drawing Sheets

DAMPER DEVICE

FIELD OF THE INVENTION

The present invention relates to an improvement of a damper device which generates a braking force by an operation of a piston.

BACKGROUND OF THE INVENTION

As a damper device which generates a braking force by an operation of a piston, there is a device disclosed in Patent Document 1. In the Patent Document 1, a seal between an inner wall of a cylinder tube and the piston is made by a seal member provided outside the piston. Here, when a pressure difference is generated between an air chamber formed on one side relative to the piston and another air chamber formed on another side relative to the piston by a movement of the piston, a force urging the seal member to the inner wall of the tube is generated. However, since the device of the Patent Document 1 has a structure such that the seal member is provided outside the piston to simply surround the piston, it is difficult to control deformation of the seal member by the operation of the above force. This kind of the damper device is, typically, used for a device to slowly move a braking subject, to have a luxury feeling, moderate appearance, or not to become strange. Thus, if the deformation of the seal member is not controlled, a braking force generated by the damper device does not become stable. Therefore, it causes inconveniences, such as a control subject stops suddenly, or plural times, or braking force is lost in a situation that the braking force should be applied.

PRIOR ART

Prior Art Patent 1

Japanese Patent Publication No. H8-133029.

SUMMARY OF THE INVENTION

Subject to be Solved by the Invention

The subject to be solved by the invention is to prove a piston member with a structure such that a seal member forming a piston body always contacts an inner wall of the cylinder member at a same configuration as much as possible in order to always provide an initial braking force.

Means for Solving the Problems

In order to solve the problems, a damper device of the invention comprises a cylinder member having an inner wall, and a piston member slidably disposed in the cylinder member, a braking force being generated by a movement or relative movement of the piston member. The piston member includes a seal member having an attachment base, and a lip portion extending from the attachment base and contacting the inner wall of the cylinder member, and a bending regulation portion assembled with the seal member for regulating an outer surface of the attachment base of the seal member.

By the movement of the piston enlarging a space located on one side of the cylinder member, when the one side of the space becomes a reduced pressure, the attachment base of the seal member is applied with a force directed to the inner wall of the cylinder member. However, since an outer side of the attachment base of the seal member is supported by the bending regulation portion, even if this force is applied, the seal member does not contact the inner wall of the cylinder member except for the lip portion. Accordingly, unstable condition caused by a situation that the braking force from the damper device generated at the time of the movement of the piston enlarging the one side of the cylinder member is applied to the inner wall of the cylinder except for the lip portion is effectively prevented.

In one embodiment of the invention, the piston member divides an inside of the cylinder member to one space, and an another space opposite to the one space, and further includes a flange portion located in the one space, and a movement regulation portion located in the another space and holding the attachment base portion of the seal member to sandwich together with the flange portion.

In one embodiment of the invention, the bending regulation portion has a wall extending from the flange portion toward the another space and perpendicular to a moving direction of the piston.

In one embodiment of the invention, the lip portion has a shape such that as it approaches an end thereof, an outer diameter for the seal member gradually increases, and has a deformable connecting portion with the attachment base to easily deform thereat.

Advantages of the Invention

In the present invention, it is possible to slidably contact the seal member forming the piston member to the inner wall of the cylinder member always in the same condition by the bending regulation portion. Thus, the initial braking force can be always obtained in this damper device.

DETAILED DESCRIPTION OF THE INVENTION

Figure 1:
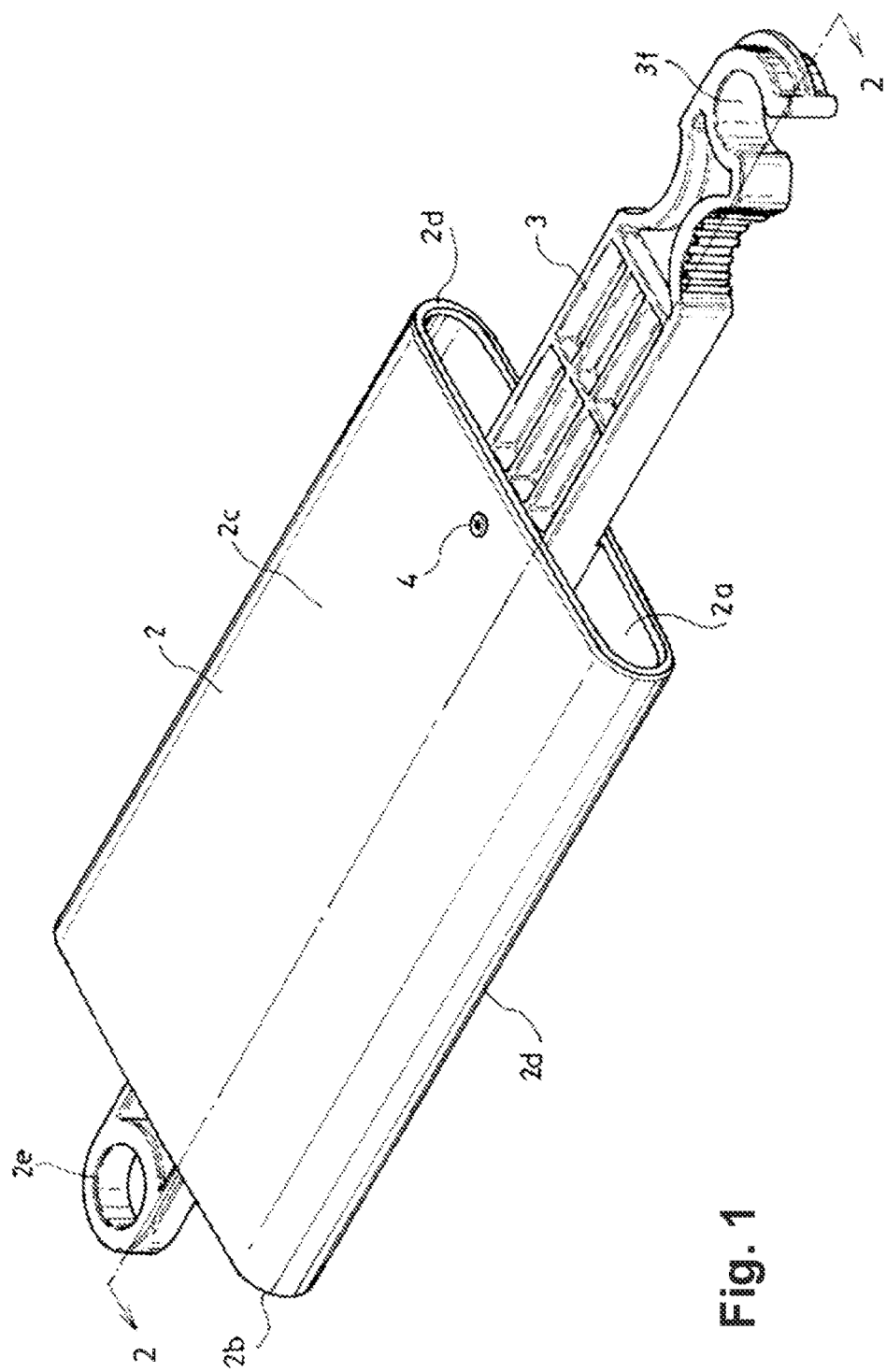
FIG. 1 is a perspective view of a first embodiment of a damper device of the invention.
Figure 2:
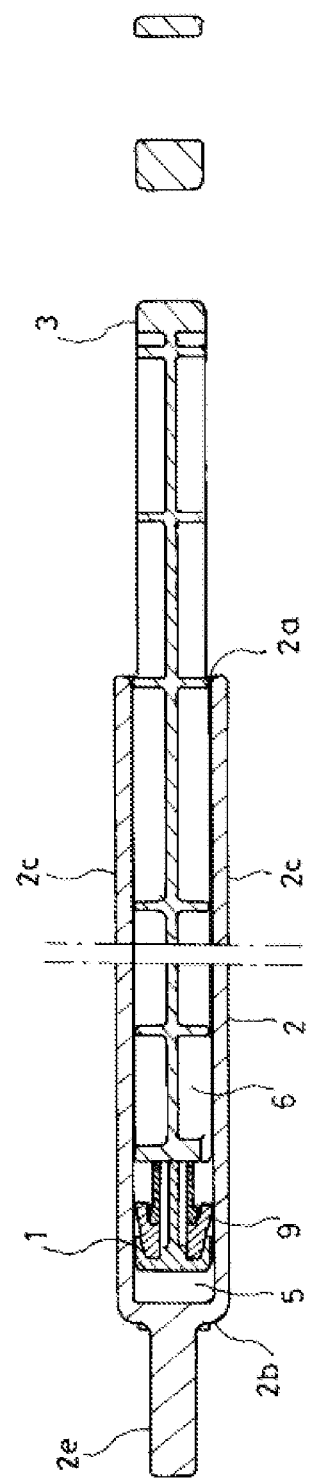
FIG. 2 is a sectional view taken along line 2-2 in FIG. 1.
Figure 3:
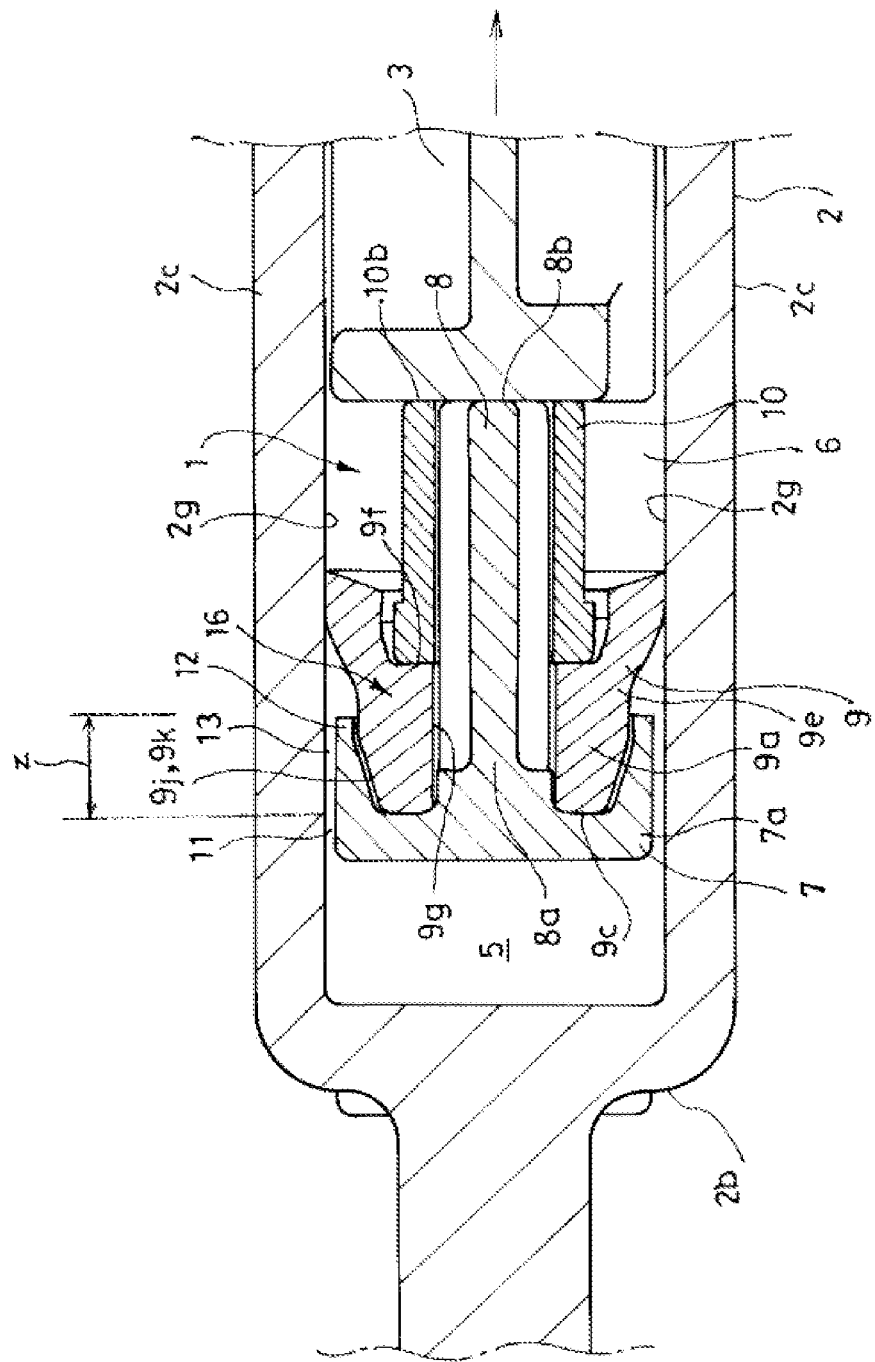
FIG. 3 is an enlarged sectional view of a main part of FIG. 2, wherein a piston member moves in a direction of enlarging one space.
Figure 4:
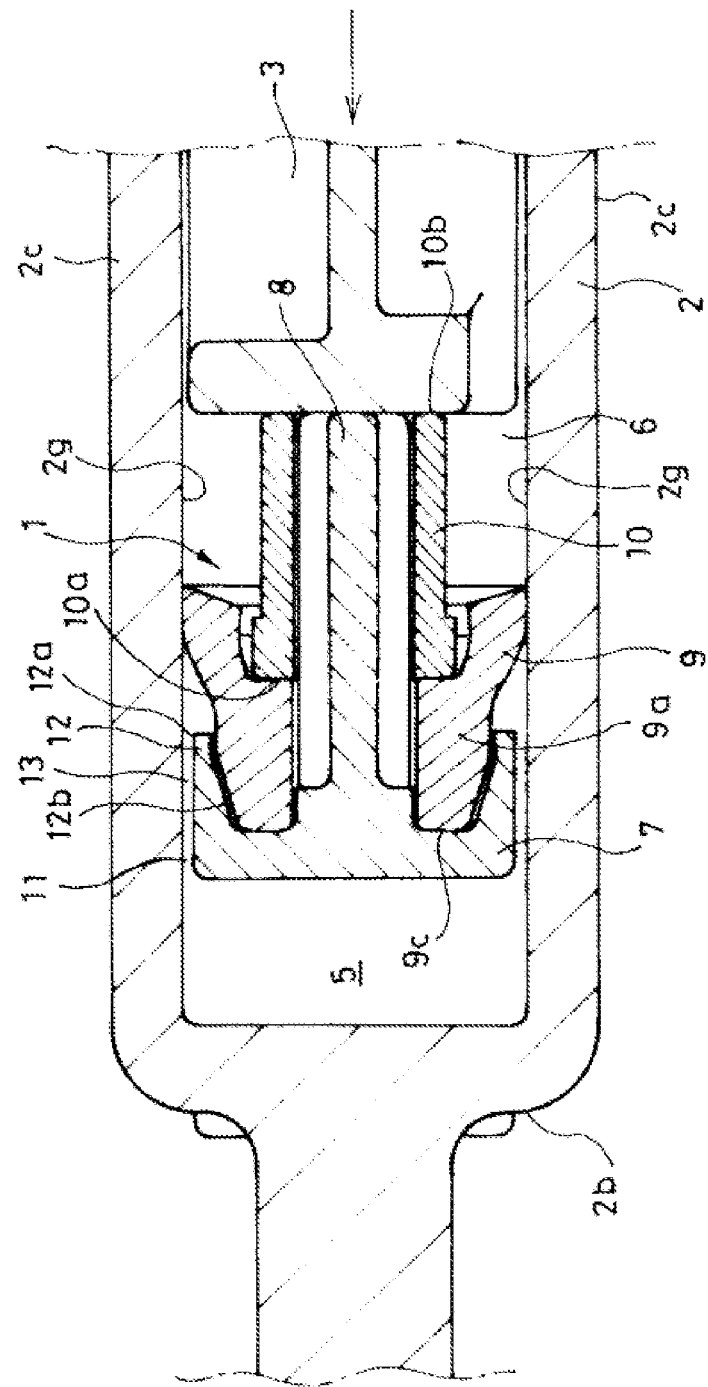
FIG. 4 is an enlarged sectional view of the main part of FIG. 2, wherein the piston member moves in a direction of reducing the one space.
Figure 5:
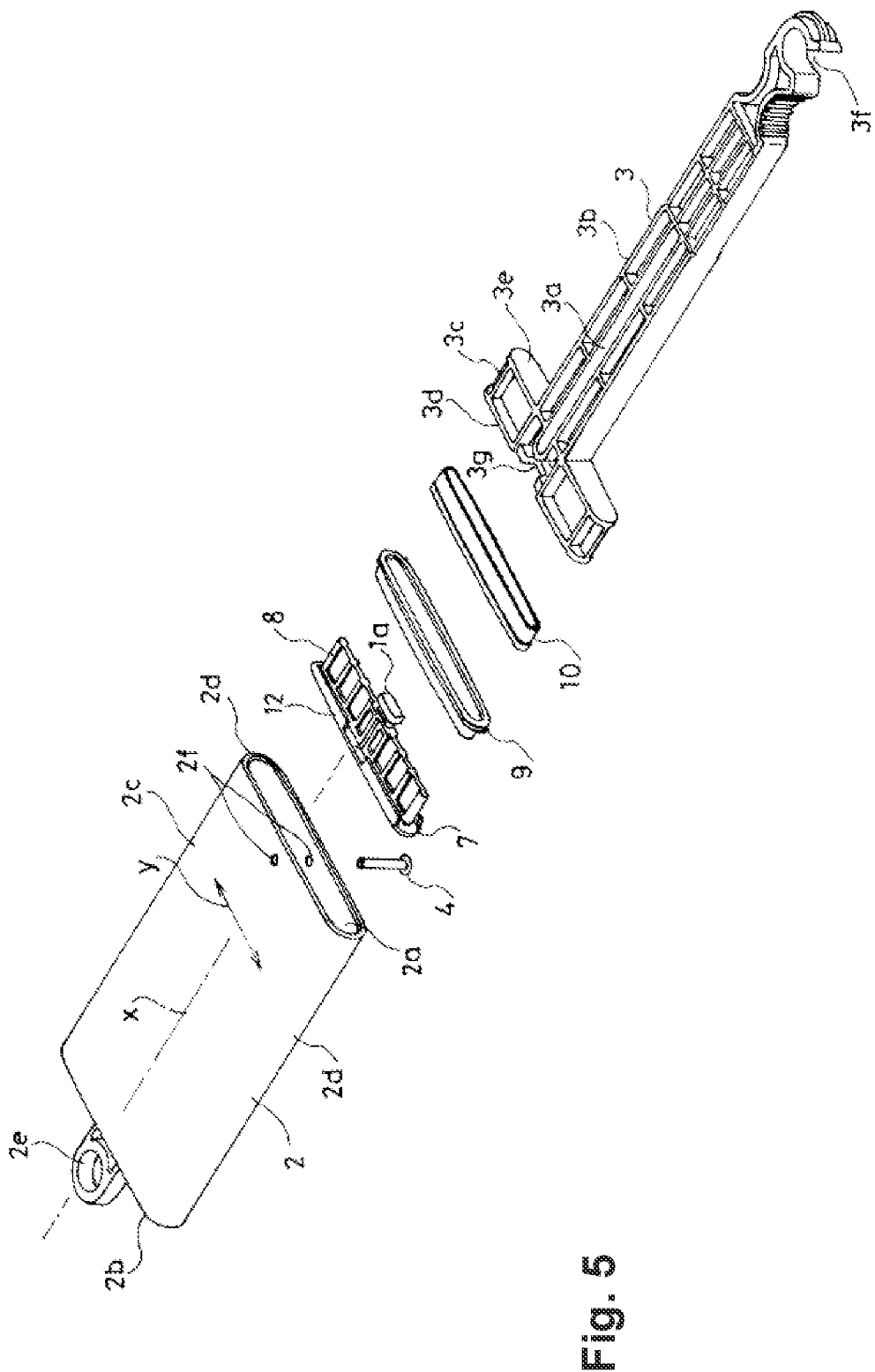
FIG. 5 is an exploded perspective view of the first embodiment.
Figure 6:
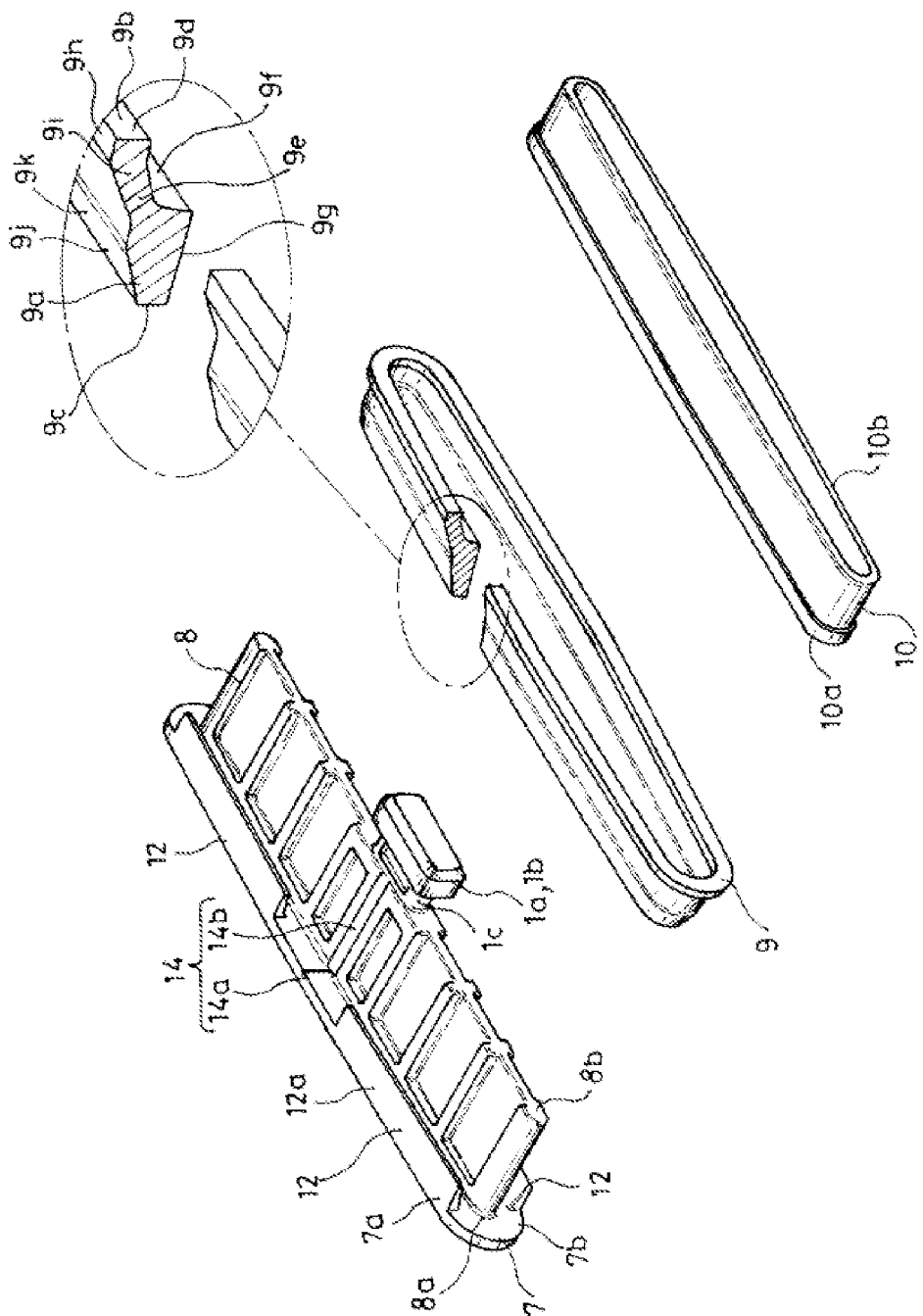
FIG. 6 is an exploded perspective view of the piston member forming the first embodiment.

The typical embodiments of the invention will be explained with reference to FIGS. 1-9. The damper device of the embodiment provides a braking force for a movement or relative movement of a piston member 1 forming the damper device. Typically, the damper device is assembled with a device with a moving portion (not illustrated), which is a subject to be braked, and a braking force is applied to the movement of the moving portion, so that the movement of the moving portion is made slowly, to have a luxury feeling, moderate appearance, or not to become strange.

The damper device comprises the piston member 1 having a rod member 3, and a cylinder member 2 retaining the piston member 1. Typically, the damper device is assembled with an article having a braking subject such that one of the rod member 3 or the cylinder member 2 is directly or indirectly coordinated with the moving portion, and the other of the rod member 3 or the cylinder member is directly or indirectly coordinated with the supporting side movably supporting the moving portion.

In the illustrated embodiment, the cylinder member 2 has a cylindrical shape with one end 2a opened, and the other end 2b closed. Although not illustrated, the cylinder member 2 may have a cylindrical shape with both ends opened while one end being closed by a different member. The cylinder member 2 has a cylindrical flattened shape with a very small thickness. In particular, the cylinder member 2 has a width side wall 2c, and a thickness side wall 2d. In a state that the cylinder member 2 is cut in a direction perpendicular to a central axis (refer to FIG. 5, i.e. a movement central axis x of the piston 1), the left and right thickness side walls 2d are curved with the curved inner sides at the side of the central axis x, and an inner sectional configuration of the cylinder member 2 has a long circular shape. A connection member 2a is formed for the coordination outside the closed end 2b.

In the illustrated embodiment, the rod member 3 is formed with a long hole 3a along the moving direction of the piston member 1. And, in the illustrated embodiment, a pin 4 is inserted to through holes 2f formed in the width side walls 2c at the one end 2a of the opened cylinder member 2 in a state that the piston member 1 and at least a part of the rod member 3 located on the piston 1 side are located in the cylinder member 2, so that the assembling condition of cylinder member 2 with the piston member 1 is kept, and the movement of the piston member 1 is guided. A seal member 9 forming the piston member 1, described later, is placed inside the cylinder member 2 in a state that a connecting portion 9e is elastically deformed in a center from a state shown in FIG. 6, and can contact with the inner wall 2g in any position where an extended portion of the lip portion 9b explained later is located in any place. By the seal member 9, a space in the cylinder member 2 is divided into one space 5 at the closed other end 2b, and the other space 6 at the opened one end 2a. On the other hand, the movement of the piston member 1 (FIG. 3) in the direction enlarging the one space 5 is permitted by a movement of a fluid (air in the illustrated embodiment) from the other space 6 to the one space 5 through an orifice explained later. On the other hand, in the illustrated embodiment, the movement (FIG. 4) of the piston member 1 in a direction reducing the space 5 is permitted, where since the one space 5 has high pressure, an elastic deformation of the seal member 1 in a direction of leaving the lip portion 9b of the seal member 9 from the inner wall 2g is permitted, so that by the movement of the fluid between the inner wall 2g of the cylinder and the lip portion, the movement of the piston is permitted.

The rod member 3 is provided with a rod main member 3b, and a rod head portion 3c integrally formed with an inner end of the rod main member 3b located in the cylinder. The rod head portion 3c includes an inner portion 3d with a long circular shape where a sectional outer shape in a direction perpendicular to the center axis x is similar to a sectional inner shape of the cylinder member 2, and an outer portion 3e. The rod main member 3b is integrated at one end with the center of the outer portion 3e of the rod head portion 3c. Also, an outer end located outside of the cylinder member 2 in the rod main member 3b is formed with a connection member 3f for the coordination.

In the illustrated embodiment, the center of the inner portion 3d of the rod head portion 3c is formed with an engaged portion 3g for an engaging portion 1a of the piston member 1. In the illustrated embodiment, the engaging portion 1a includes a neck portion 1c, and an engagement head portion 1b integrated with a center of a rear end portion 8b in a body portion 8 of the piston 1 through the neck portion 1c, explained later. On the other hand, the engaged portion 3g includes a cut portion 3h for passing the head portion therethrough, and an engagement space 3i of the engagement head portion 1b formed between the inner portion 3d and the outer portion 3e. In the illustrated embodiment, the engagement head portion 1b is placed in the receiving opening 1i by utilizing the cut portion 3h of the head portion 3c from a state that a seal member 9 in a flat shape explained later and a movement regulation member 10 are wound around a body portion 8 of the piston member 1. Thus, the piston member 1 and the rod member 3 are integrated, and at the same time, the seal member 9 and the movement regulation member 10 are retained between a flange portion 7 of the piston member 1 explained later and an inner portion 3d of the rod head portion 3c.

The piston member 1 comprises the flange portion 7, the body portion 8, the seal member 9, and the movement regulation member 10.

The body portion 8 has an elongated rectangular shape along a width direction y (refer to FIG. 5) of the cylinder member 2. The space in the cylinder member 2 is divided to, as stated before, the one space 5 and the another space 6 by the piston member 1. The body portion 8 includes a front end portion 8a directed to the one space 5 side, and a rear end portion 8b directed to the another end space 6 side.

The flange portion 7 has a flange shape formed at the front end portion 8b of the body portion 8. The outer shape of the flange portion 7 has an elongated circular shape similar to an inner sectional shape of the cylinder member 2. Formed between an edge portion 7a of the flange portion 7 and the inner wall 2g of the cylinder member 2 is a gap 11 allowing the fluid (air in this embodiment) to pass at any portion around the center axis (refer to FIGS. 3 and 4).

The seal member 9 includes an attachment base portion 9a where the inner face 9g substantially contacts the piston member 1, and a lip portion 9b extending from the attachment base portion 9a and slidably contacting the inner wall 2g of the cylinder member 2. The seal member 9 has an flattened ring shape. The seal member 9 is typically formed of rubber or plastic with rubber like elasticity. The seal member 9 has the same shape in section perpendicular to the central axis x, in any position along the central axis x.

In the seal member 9, the attachment base portion 9a extends from the front end portion 9c to a middle portion in the front and rear direction (along the center axis x), and the lip portion 9b extends from the middle portion to the rear end portion 9d.

The sectional inner peripheral shape perpendicular to the central axis x of the attachment base portion 9a has a shape complementary to the sectional outer peripheral shape of the body portion 8 in the same direction.

The lip portion 9b is formed such that as it comes to an extending end, an outer diameter of the seal member gradually increases, so that the connecting portion 9e with the attachment base portion 9a is easily deformed. Namely, the lip portion 9b has a skirt shape extending from the attachment base portion 9a to the other space 6 side. In the illustrated embodiment, the connecting portion 9e has the thickness in the direction perpendicular to the central axis x smaller than the other portions of the seal member 9, so that the connecting portion 9e is deformed easily. As thus made, the lip portion 9b can be elastically deformed always at a constant position, so that the lip portion 9b can slidably contact relative to the inner wall 2g of the cylinder member 2 always in the same condition.

In the illustrated embodiment, the inner side of the seal member 9 is formed with a surrounding step face 9f facing the another space 6 side. A portion between the front end portion 9c of the seal member 9 and the surrounding step face 9f functions as the attachment base portion 9a, and a portion between the surrounding step face 9f and the rear end portion 9d of the seal member 9 functions as the lip portion 9b.

An inner face 9g of the attachment base portion 9a becomes a face substantially parallel to the central axis x. The surrounding step face 9f becomes a face substantially perpendicular to the central axis x, The extending end of the lip portion 9b becomes a thick portion 9h having an outer face substantially parallel to the central axis x and an inner face. A portion between the attachment base portion 9a and the thick portion 9h becomes a connecting portion 9i having an outer face inclined such that as it comes closer to the thick portion 9h, the thickness of the lip portion 9b gradually increases, and an inner face. An outer face 9k of the attachment base portion 9a becomes an inclined face 9j which gradually increases a thickness of the attachment base portion 9a as it comes to a middle between the front end portion 9c of the seal member 9 and the attachment base portion 9a in the front-back direction until it comes to the middle (refer to FIG. 6).

A movement regulation portion 10 is located on the another space portion 6 side and holds to sandwich the attachment base portion 9a of the seal member 9 together with the flange portion 7 located on the one space 5 side.

In the illustrated embodiment, the movement regulation portion 10 has a flatted cylindrical shape. An outer shape in section perpendicular to the center axis x of the movement regulation portion 10 has a shape complementary to the outer shape in section of the body portion 8 in the same direction.

Accordingly, in the illustrated embodiment, the body portion 8 is placed inside the seal member 9, and placed into the movement regulation portion 10, and thereafter, the piston member 1 and the rod member 3 are integrated as explained before. Thus, the seal member 9 and the movement regulation portion 10 are sandwiched at the front and back between the flange member 7 and the inner portion 3d of the rod head portion 3c, and held. In particular, the front end 9c of the seal member 9 contacts the flange member 7, the surrounding step face 9f of the seal member 9 contacts the front end portion 10a of the movement regulation portion 10, and the inn portion 3d of the rod head portion 3c contacts the rear end 10b of the movement regulation portion 10.

At the time of the movement of the piston member 1 in the direction of reducing the one space 5 (the movement show by an arrow in FIG. 4), the seal member 9 where the lip portion 9b slidably contacts the inner wall 2g of the cylinder member 2 receives a force in the direction opposite to the movement, but the seal member 9 is held in the initial position by the movement regulation portion 10. The braking force generated by the damper device at the time of movement of the piston member 1 reducing the one space 5 operates not to be unstable by misalignment of the seal member 9.

In the present embodiment, the piston member 1 includes a bending regulation portion 12 contacting an outer face 9k of the attachment base portion 9a side. The bending regulation portion 12 has a long wall shape projecting from the flange portion 7 to the another space 6 side in a direction perpendicular to the movement direction of the piston member 1.

In the first embodiment shown in FIGS. 1-7, the bending regulation portion 12 is formed, except for the center, in the edge portion 7a along the long axis of the flange portion 7 having the outer shape in the long circular shape. Namely, the bending regulation portion 12 is respectively formed at the edge portion 7a facing one portion of the width side wall portion 2c of the cylinder member 2 at the flange portion 7 (at an upper side of the flange portion 7 in FIG. 6), and the edge portion 7a facing the other portion of the width side wall portion 2c of the cylinder member 2. In the illustrated embodiment, the bending regulation portion 12 projects, in the outer face 9k of the attachment base portion 9a of the seal member 9, for a size covering a portion which becomes the inclined face 9j, from the flange portion 7 to the other space 6 side. The outer face 12a of the bending regulation portion 12 is substantially parallel to the inner wall 2g of the cylinder member 2, and a space 13 for passing the fluid is formed therebetween (refer to FIGS. 3 and 4). The inner shape of the bending regulation portion 12 has a shape complementary to the outer shape of the attachment base portion 9a of the seal member 9. Namely, a part of the inner face 12b of the bending regulation portion 12 becomes an inclined face.

In the first embodiment, in the center of the flange portion 7, a first groove 14a extending from the edge portion 7a to the bottom is formed in a face 7b facing the other space 6 side of the flange portion 7, and a second groove 14b is formed in the center of the body portion 8 between the front end 8a and the rear end 8b, wherein the first groove 14a and the second groove 14b communicate. At the time of movement of the piston member 1 which enlarges the one space 5 (movement in the direction by an arrow in FIG. 3), the first groove 14a and the second groove 14b become the orifice 14 to allow the piston member 1 to move.

At the time of movement of the piston member 1 which enlarges the one space 5 (movement in the direction by the arrow in FIG. 3), the one space 5 side becomes a reduced pressure, so that a force directed to the inner wall 2g of the cylinder member 2 (force in a direction enlarging the attachment base portion 9a) at the attachment base portion 9a of the seal member 9 is applied. However, since the outer face 9k side of the attachment base portion 9a of the seal member 9 is supported by the bending regulation portion 12, even if this force is applied, the seal member 9 does not contact the inner wall 2g of the cylinder member 2 except for the lip portion 9b. Accordingly, in the embodiment, at the time of the movement of the piston member 1 which enlarges the one space 5, even in a state such as the braking force from the damper device is applied to the inner wall 2g of the cylinder member 2 except for the lip portion 9b, unstable condition does not occur.

The extending size of the bending regulation portion 12 from the flange portion 7 is adjusted according to necessity. Namely, the extending size z (refer to FIG. 3) may be smaller than that in the first embodiment, but on the other hand, larger than that in the first embodiment. Further, the extending size of the bending regulation portion 12 may be better extended until it reaches the connecting portion 9e side of the lip 9b.

Figure 7:
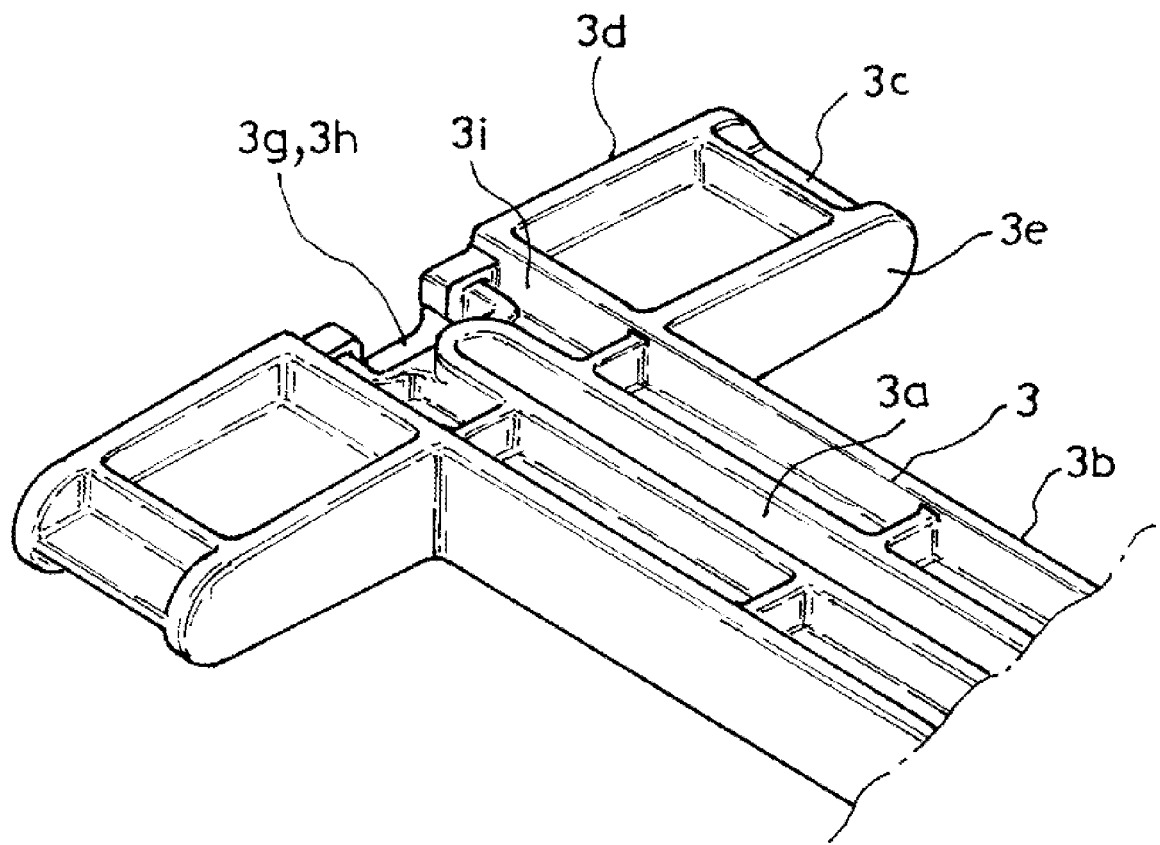
FIG. 7 is a perspective view of a main part of a rod forming the first embodiment.

In a second embodiment as shown in FIG. 7, the bending regulation portion 12 is formed along the entire length of the edge portion 7a along the long axis of the flange portion 7, the outer shape of which has a long circular shape. In the second embodiment, the bending regulation portion 12 is, respectively, formed at the edge portion 7a facing one side of the width side wall 2c of the cylinder member 2 in the flange portion 7, and the edge portion 7a facing the other side of the width side wall 2c of the cylinder member 2 in the flange portion 7. In the second embodiment, on the side facing the side wall 2d of the cylinder member 2 in the flange portion 7, a first groove 14a is formed extending from the edge 7a to the base, and on the side facing the thickness side wall 2d of the cylinder member 2 in the body portion 8, a second groove 14b is formed to extend between the front end 8a and the rear end 8b, wherein the first groove 14a and the second groove 14b communicate. At the time of movement of the piston member 1 where the one space 5 enlarges, the first groove 14a and the second groove 14b become an orifice 14 to allow the movement of the piston member 1.

If formed as the second embodiment, it is possible to support the entire portion facing the with side wall 2c of the cylinder member 2 in the attachment base portion 9a of the seal member 9 by the bending regulation portion 12.

Figure 8:
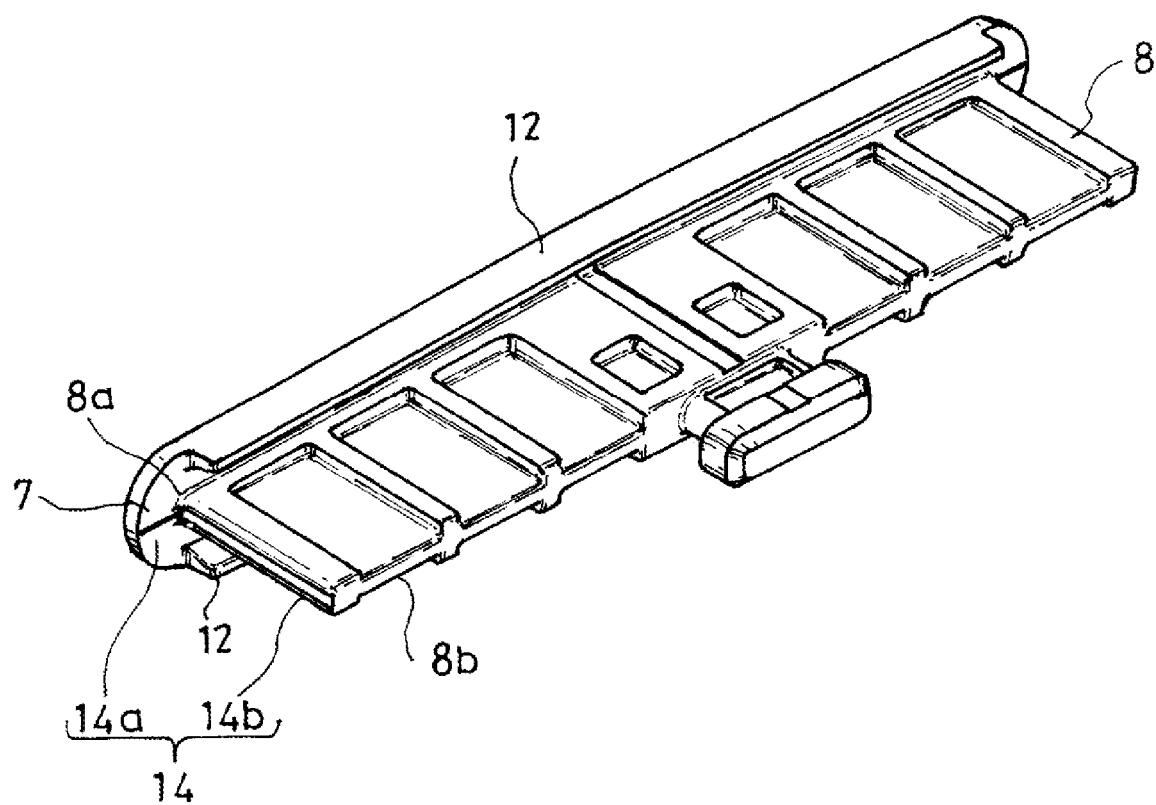
FIG. 8 is a perspective view of a main part of a piston member forming a second embodiment of the damper device of the invention.
Figure 9:
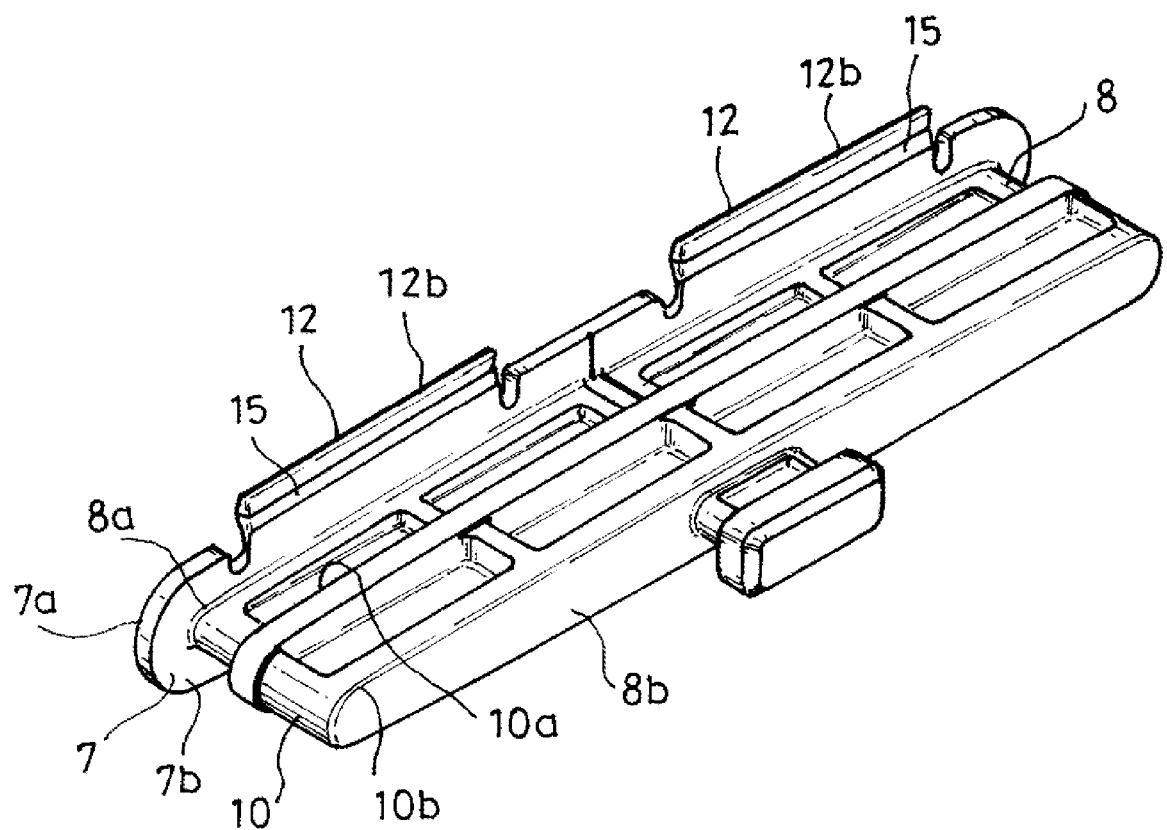
FIG. 9 is a perspective view of a main part of a piston member forming a third embodiment of the damper device of the invention.

In a third embodiment as shown in FIG. 8, as in the first embodiment, the bending regulation portion 12 is formed at a portion of the edge portion 7a, except for the center portion, along the long axis of the flange portion 7, the outer shape of which becomes a long circular shape. Also, in the third embodiment, the bending regulation portion 12 is connected to the flange portion 7 with a thin thickness portion 15 which can be easily deformed. In the third embodiment, the bending regulation portion 12 is integrally formed with the flange portion 7b such that one face which becomes an inner face 12b of the bending regulation portion 12 forms the same face directed to the face 7b facing the other space 6 side of the flange portion 7. And, in the third embodiment, the rear end 8b side of the body portion 8 passes through the seal member 9 until the front end 9c of the seal member 9 abuts against the flange portion 7, and is bent, at the thin portion 15 as a hinge, to a position where the bending regulation portion 12 sandwiches the attachment base portion 9a of the seal member 9 with the body portion 8, so that it is possible to form the piston member 1 as in the first embodiment.

In the third embodiment, the movement regulation portion 10 is integrally formed with the body portion 8. As shown in the first embodiment, as the extending size of the bending regulation portion 12 is made larger, a size in the front-rear direction of the space 16 between the bending regulation portion 12 and the movement regulation portion 10 becomes smaller. However, as in the third embodiment, if the body portion 8 and the movement regulation portion 10 are integrally formed, it is possible to retain, without trouble, the attachment base portion 9a of the seal member 9 inside the bending regulation portion 12.

Apparently, the present invention is not limited to the above embodiments, and the invention includes all other embodiments which can perform the object of the invention. The disclosure of Japanese Patent Application No. 2021-021499, filed on Feb. 15, 2021, is incorporated in the application.

EXPLANATION OF NUMERALS

1 Piston member
2 Cylinder member
2g Inner wall
7 Flange portion
9 Seal ember
9a Attachment base portion
9b Lip portion
10 Movement regulation portion
12 Bending regulation portion

What is claimed is:

1. A damper device for providing a braking force, comprising:
a cylinder member having an open end, a closed end at a side opposite to the open end, and an inner wall, and
a piston member slidably disposed in the cylinder member, the braking force being generated by a movement or relative movement of the piston member,
wherein the piston member includes:
a rod member having a head portion at a front end thereof facing the closed end,
a flange portion located at the front end of the rod member and directly facing the closed end of the cylinder member, the flange portion having a body portion integrally formed with the flange portion to be arranged between the flange portion and the head portion, and a bending regulation portion integrally formed with the flange portion and extending from a circumference of the flange portion in a direction away from the closed end along the body portion,
a seal member having an annular ring shape, and including an attachment base arranged on the flange portion and surrounded by the bending regulation portion, and a lip portion integrally formed with the attachment base and extending from a rear end of the attachment base radially outwardly in the direction away from the closed end while gradually increasing an outer diameter thereof from the attachment base as a distance from the attachment base increases to thereby contact the inner wall of the cylinder member, and
a cylindrical movement regulation portion arranged around the body portion between the head portion of the rod member and the attachment base of the seal member, the lip portion being located outside the movement regulation portion, and
wherein a front end of the seal member contacts the flange portion, a front end of the movement regulation portion contacts a step face of the attachment base of the seal member, and a rear end of the movement regulation portion contacts the head portion of the rod member.

2. A damper device according to claim 1, wherein the lip portion has a rear surface to be spaced from the head portion, and a side surface contacting the inner wall of the cylinder member.

3. A damper device according to claim 2, wherein one seal member and one movement regulation portion are arranged between the flange portion and the head portion.

* * * * *